US005598934A

United States Patent [19]
Krummell et al.

[11] Patent Number: 5,598,934
[45] Date of Patent: *Feb. 4, 1997

[54] LATCHING DEVICE FOR A PUSH-BACK CART SYSTEM

[75] Inventors: John V. R. Krummell, 591-102 John K. Dr., Long Beach, Calif. 90803; Kenneth E. Davison, Hermosa Beach, Calif.

[73] Assignee: John V. R. Krummell, Long Beach, Calif.

[ * ] Notice: The term of this patent shall not extend beyond the expiration date of Pat. No. 5,415,300.

[21] Appl. No.: 292,868

[22] Filed: Aug. 19, 1994

Related U.S. Application Data

[63] Continuation-in-part of Ser. No. 148,214, Nov. 5, 1993, Pat. No. 5,415,300.

[51] Int. Cl.⁶ .................................................. A47F 5/00
[52] U.S. Cl. .......................... 211/151; 211/162; 312/201; 414/276
[58] Field of Search ............................ 104/251, 248; 414/276, 286; 211/151, 162; 312/198, 201

[56] References Cited

U.S. PATENT DOCUMENTS

| | | |
|---|---|---|
| 2,880,024 | 3/1959 | Hewitt . |
| 3,038,613 | 6/1962 | Sylvester et al. . |
| 3,399,784 | 9/1968 | Buchbinder . |
| 3,465,894 | 9/1969 | Setecka . |
| 3,567,039 | 3/1971 | Evans . |
| 3,744,646 | 7/1973 | Duncan et al. . |
| 3,757,967 | 9/1973 | Golbridge . |
| 4,140,225 | 2/1979 | Hilgers et al. . |
| 4,155,462 | 5/1979 | Bendel . |
| 4,197,047 | 4/1980 | Haldimann . |
| 4,223,792 | 9/1980 | Aspen . |
| 4,227,466 | 10/1980 | Rooklyn . |
| 4,341,313 | 7/1982 | Doring . |
| 4,462,500 | 7/1984 | Konstant et al. . |
| 4,523,794 | 6/1985 | Peterman ............................ 312/201 |
| 4,607,896 | 8/1986 | Peterman ............................ 312/201 |
| 4,613,270 | 7/1986 | Konstant et al. . |
| 4,657,317 | 4/1987 | Gemma . |
| 4,687,404 | 8/1987 | Seiz et al. . |
| 4,708,411 | 11/1987 | Peterman ............................ 312/201 |
| 4,715,765 | 12/1987 | Agnoff . |
| 4,738,369 | 4/1988 | Desjardins . |
| 4,773,546 | 9/1988 | Konstant . |
| 4,915,240 | 4/1990 | Konstant . |
| 4,949,852 | 8/1990 | Allen . |
| 4,955,489 | 9/1990 | Allen . |
| 4,982,851 | 1/1991 | Konstant . |
| 5,137,159 | 8/1992 | Collins et al. . |
| 5,141,118 | 8/1992 | Gay . |
| 5,170,896 | 12/1992 | Konstant . |
| 5,180,069 | 1/1993 | Krummell . |
| 5,193,696 | 3/1993 | Price et al. ............................ 211/162 |
| 5,203,464 | 4/1993 | Allen . |
| 5,312,004 | 5/1994 | Krummell et al. . |
| 5,316,157 | 5/1994 | Konstant . |
| 5,328,038 | 7/1994 | Allen . |
| 5,415,300 | 5/1995 | Krummell et al. ............................ 211/151 |

OTHER PUBLICATIONS

Artco Corporation Advertisement—Apr. 1990.

3D Storage Systems Limited Pushback Brochure.

Ridg-U-Rak Push-bak Storage Systems Brochure.

*Primary Examiner*—Robert W. Gibson, Jr.
*Attorney, Agent, or Firm*—Lyon & Lyon

[57] ABSTRACT

A latching mechanism for a push-back cart storage system includes an outer side member having a notch, and a cart frame section having a wheel assembly supported on the outer side member and a latch assembly engageable with said notch. The mechanism prevents premature rearward rolling of unloaded carts in multiple cart push-back systems wherein the wheels of rearward rolling loaded carts roll on the unloaded carts.

19 Claims, 8 Drawing Sheets

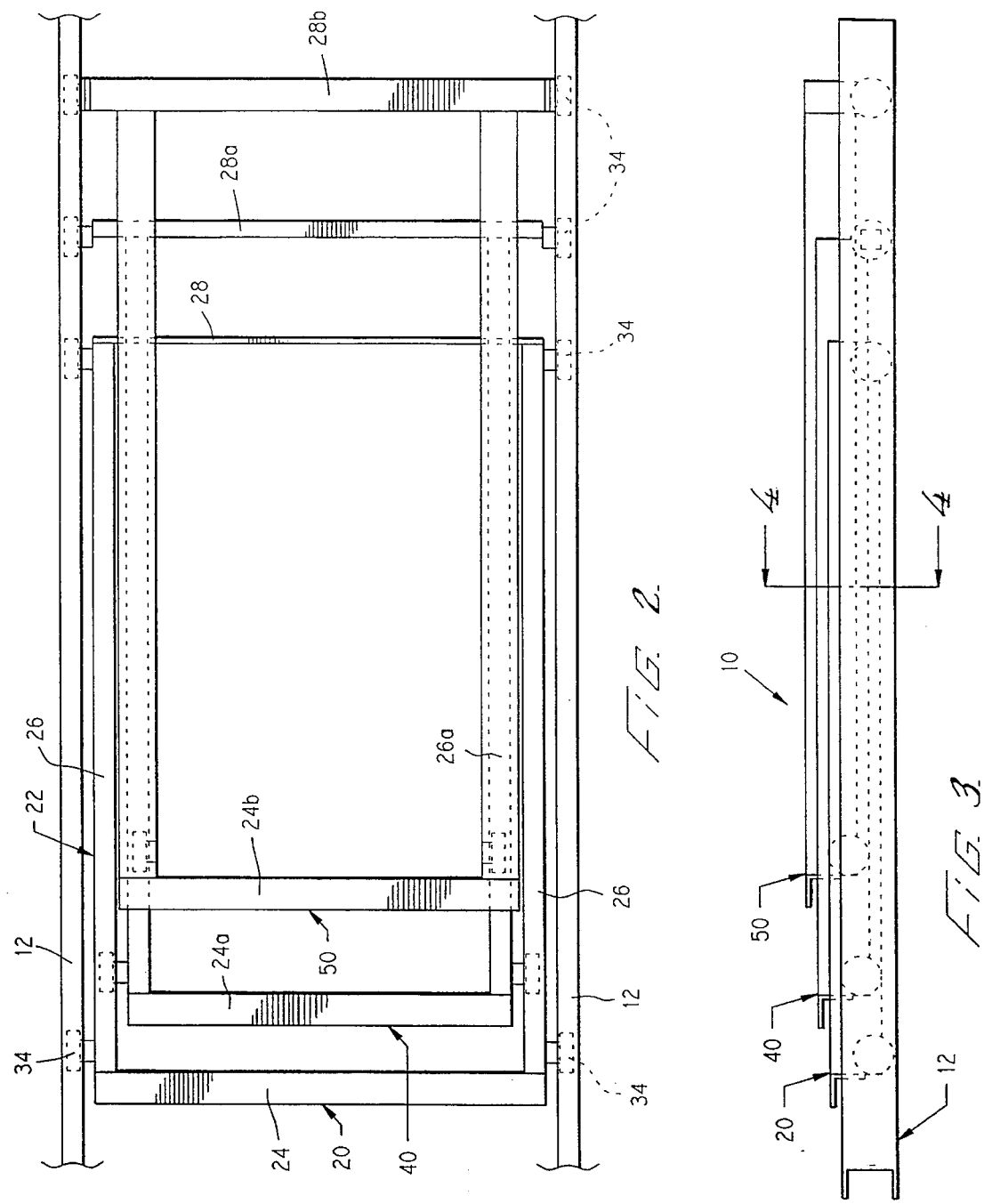

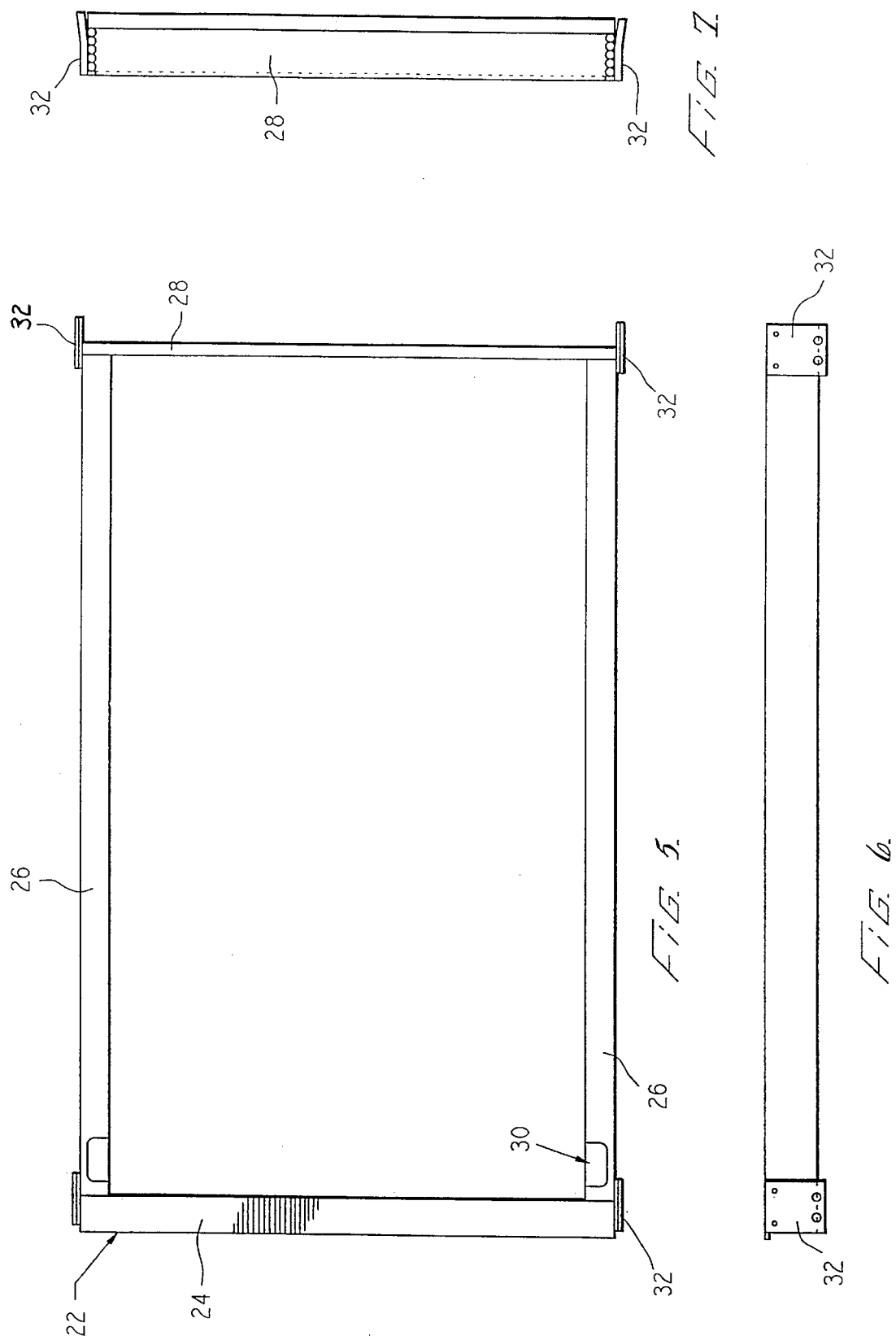

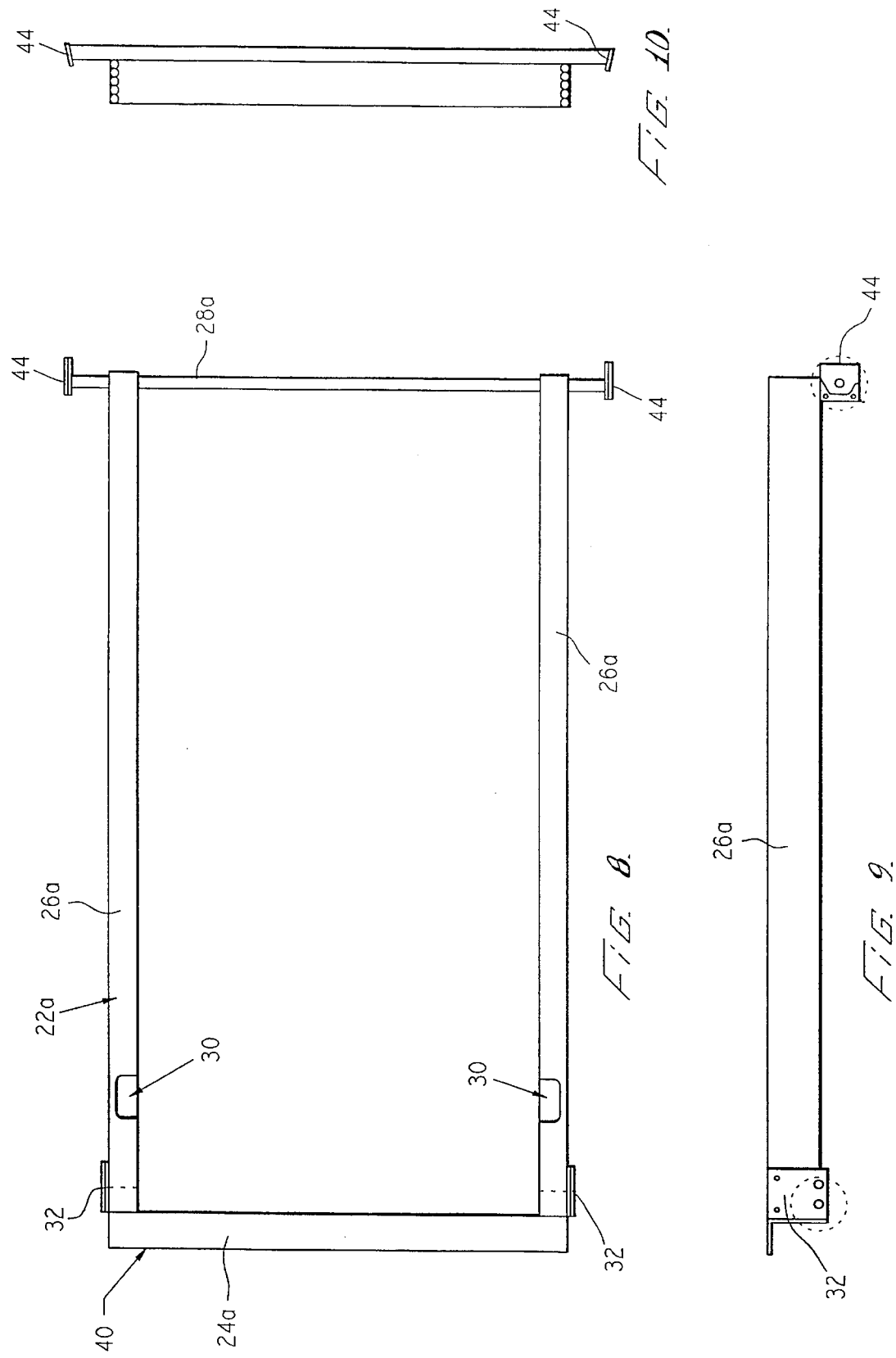

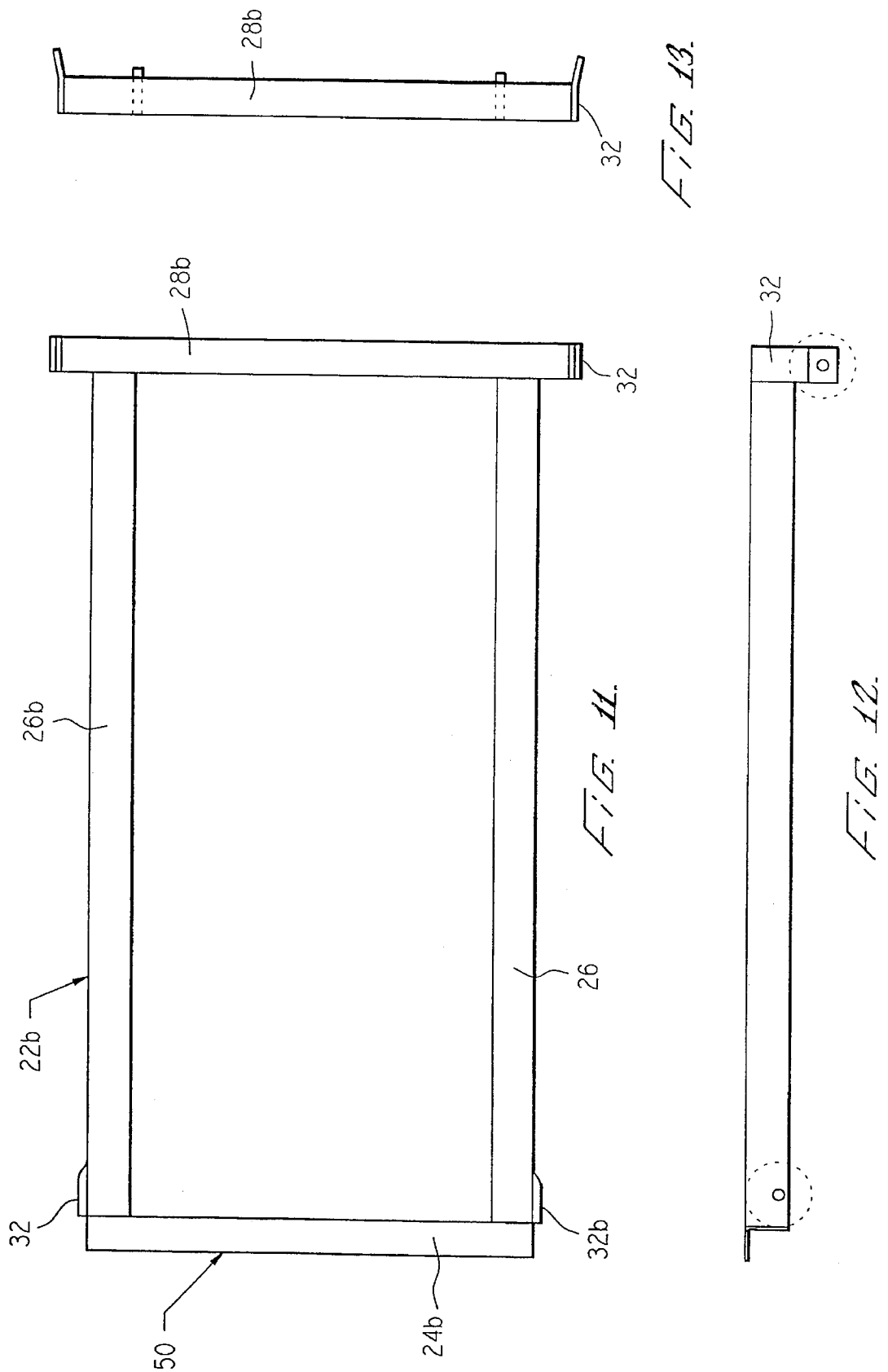

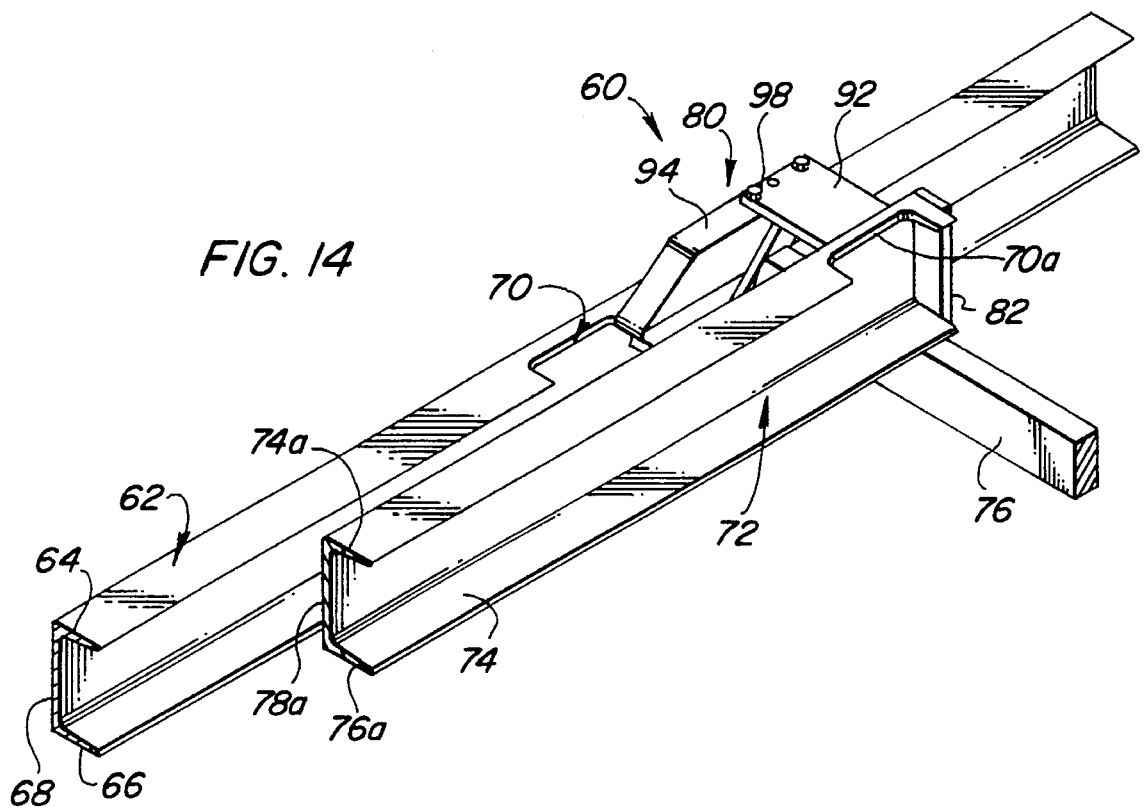
FIG. 14
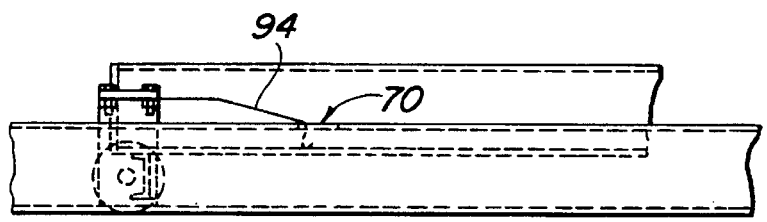
FIG. 15
FIG. 16

LATCHING DEVICE FOR A PUSH-BACK CART SYSTEM

This application is a continuation-in-part of our application Ser. No. 08/148,214, filed Nov. 5, 1993 and now U.S. Pat. No. 5,415,300.

BACKGROUND OF THE INVENTION

The field of the invention is push-back storage systems.

Push-back cart storage systems typically use rolling carts for carrying pallets or other cargo, on slightly inclined rails. By providing several carts on a set of rails, useable space between aisles in e.g., a warehouse, is increased as multiple pallets can be stored and retrieved from a single aisle. Consequently, aisle space necessary in conventional storage racks for forklift access may be used for additional storage racks, providing more efficient use of space.

Although various push-back cart storage systems have been used in the past, there is a need for an improved system which may be readily fabricated from standard structural members, is convenient and effective in use, and which provides for increased storage efficiency.

SUMMARY OF THE INVENTION

To these ends, the present push-back cart storage system includes a pair of spaced apart support rails. An outer or first cart has wheels which roll on the support rails. The outer cart has side members and a middle or second cart has front wheels which roll on the side members of the outer cart. Rear wheels on the middle cart roll directly on the support rails. For a four deep system, an inner cart may be provided with front wheels rolling on side members of the middle cart, and with rear wheels of the inner cart rolling directly on the support rails.

A latching mechanism in a push-back cart storage system has a latch preferably mounted to the second cart in a two cart push-back system, the second or middle and third or inner carts in a three cart push-back system, or generally, the second through nth carts in an n-cart push-back system.

With a spring latch arrangement, the second cart, for example, is held in place by the engaged spring until the loaded first cart reaches its rearmost position relative to the second cart. Once the first cart reaches that position, the rear wheels of the first cart release a spring. The release is caused by the force of the forklift, which, in moving the second pallet into the pallet bay for ultimate placement onto the second cart, continues to push the first pallet rearwardly even after the first cart is in its rearmost position relative to the second cart.

Advantageously, in a switch latch arrangement, the second cart, for example, is held in place by the engaged switch. The switch releases when the first cart engages the switch mounted on the second cart as the first cart approaches its rearmost position relative to the second cart. The release is preferably achieved as the switch rotates and thereby loses contact with a stationary member.

Of course, in addition to these spring and switch latches, various other mechanical equivalents may be used within the scope of the invention, to hold the carts in position while loading.

Accordingly, it is an object of the invention to provide an improved push-back cart storage system. Other and further objects and advantages will appear hereinafter.

BRIEF DESCRIPTION OF THE DRAWINGS

In the drawings, wherein similar reference characters denote similar elements throughout the several views:

FIG. 2 is a plan view thereof;

FIG. 3 is a side elevation view thereof;

FIG. 5 is a plan view of an outer cart frame;

FIG. 6 is side elevation view thereof;

FIG. 7 is a rear elevation view thereof;

FIG. 8 is a plan view of a middle cart frame;

FIG. 9 is a side elevation view thereof;

FIG. 10 is an end elevation view thereof;

FIG. 11 is a plan view of an inner cart frame;

FIG. 12 is a side elevation view thereof;

FIG. 13 is an end elevation view thereof;

FIG. 14 is a perspective view of a first embodiment of the present latching mechanism;

FIG. 15 is a side elevation view thereof, with the spring latch in the disengaged position;

FIG. 16 is a side elevation view thereof with the spring latch in the engaged position;

DETAILED DESCRIPTION OF THE PREFERRED EMBODIMENT

Figure 1:
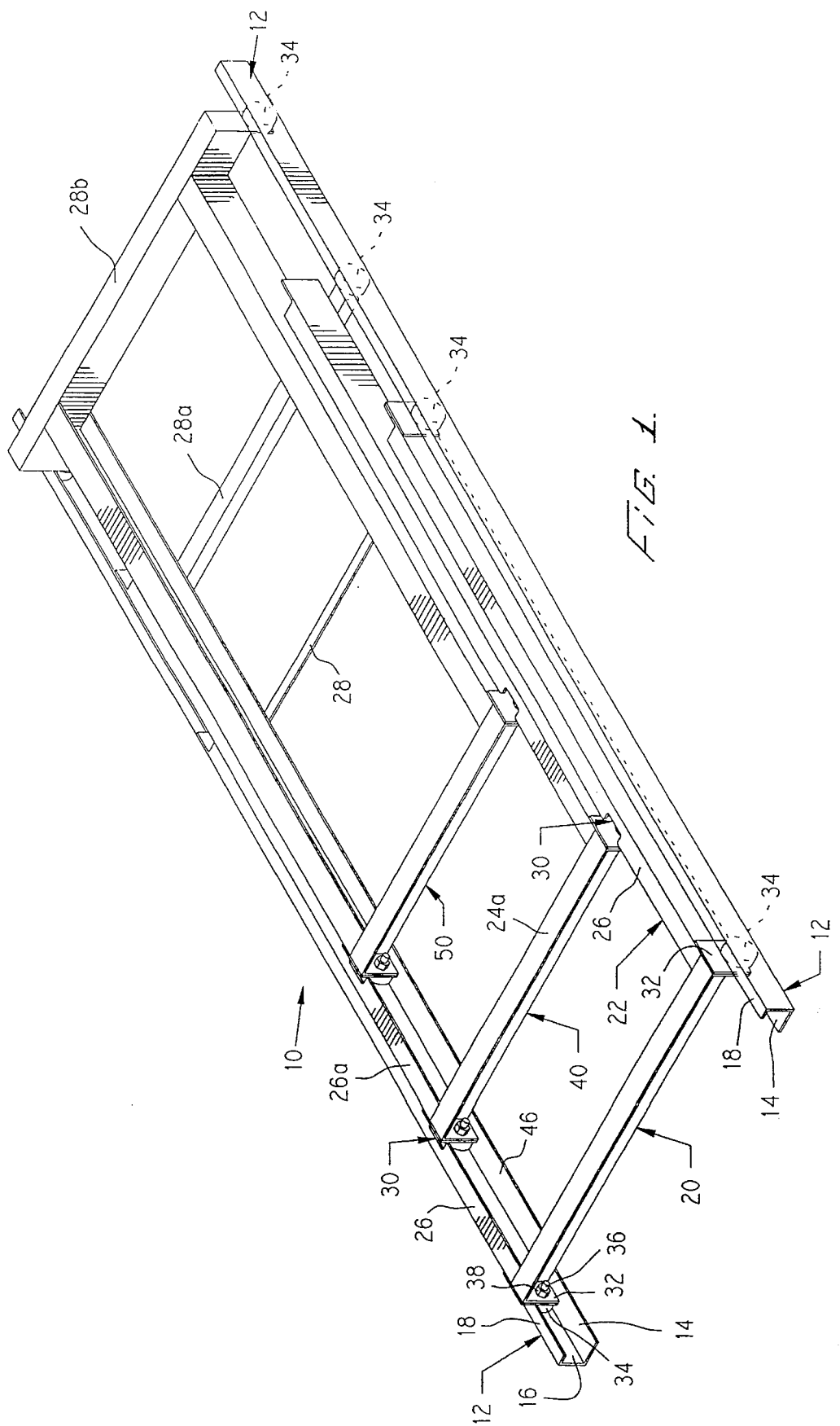
FIG. 1 is a perspective view of the present push-back cart storage system.

Turning now to the drawings, as shown in FIG. 1, the present push-back cart storage system 10 includes a pair of spaced apart support rails 12. The support rails 12 may be of various designs, e.g., I-beams, C-sections, etc., and as shown in FIG. 1 in a preferred embodiment, include an upper leg or flange 18, a lower flange 14 longer than the upper flange 18, and a web 16 connecting the upper flange 18 and lower flange 14.

Referring to FIGS. 1, 2, and 6, an outer cart 20 includes a preferably rectangular frame 22 having a front cross member 24, side members 26 and a rear cross member 28. The rectangular frame 22 may be made of welded together standard structural beams or shapes. The side members 26 include a lower inner flange 46 similar to flange 14 of the support rails 12.

Angle plates 32 are preferably attached at the four corners of the frame 22 of the outer cart 20 to support wheels 34. The wheels 34 may be attached to the angle plates 32 via a nut 38 clamping the wheel stud to the angle plate 32, as shown in FIG. 1.

Referring to FIGS. 1, 2, and 8–10, a middle cart 40 also includes a preferably rectangular frame 22a having a front cross member 24a, side members 26a and a rear cross member 28a, each slightly shorter than the corresponding members on the outer cart 20, such that the middle cart 40 may be fit within or contained by the outer cart 20.

As shown in FIG. 8, the front end of the middle cart 40 preferably includes angle plates 32. However, the back end of the middle cart 40 has extended angled ends projecting from the rear cross member 28a.

Referring to FIGS. 1–4, the front wheels 34 of the middle cart 40, supported on the angle plates 32, roll on the lower flange 46 of the side members 26 of the outer cart 20. However, the rear wheels 34 on the middle cart 40, mounted on the angle ends 44 of the rear cross member 28a, roll on the flange 14 of the support rails 12. Referring to FIG. 9, the rear wheels on the middle cart 40 are positioned slightly below the front wheels, so that the middle cart 40 remains level with its front wheels riding on the support rails 12 and its rear wheels riding on the side members 26 of the outer cart 20.

As shown in FIGS. 1 and 5, slots 30 are provided in the side members 26 on the outer cart 20 to allow the front wheels of the middle cart 40 to be positioned into the lower flange of the side members 26 of the outer cart 20, during installation.

Figure 4:
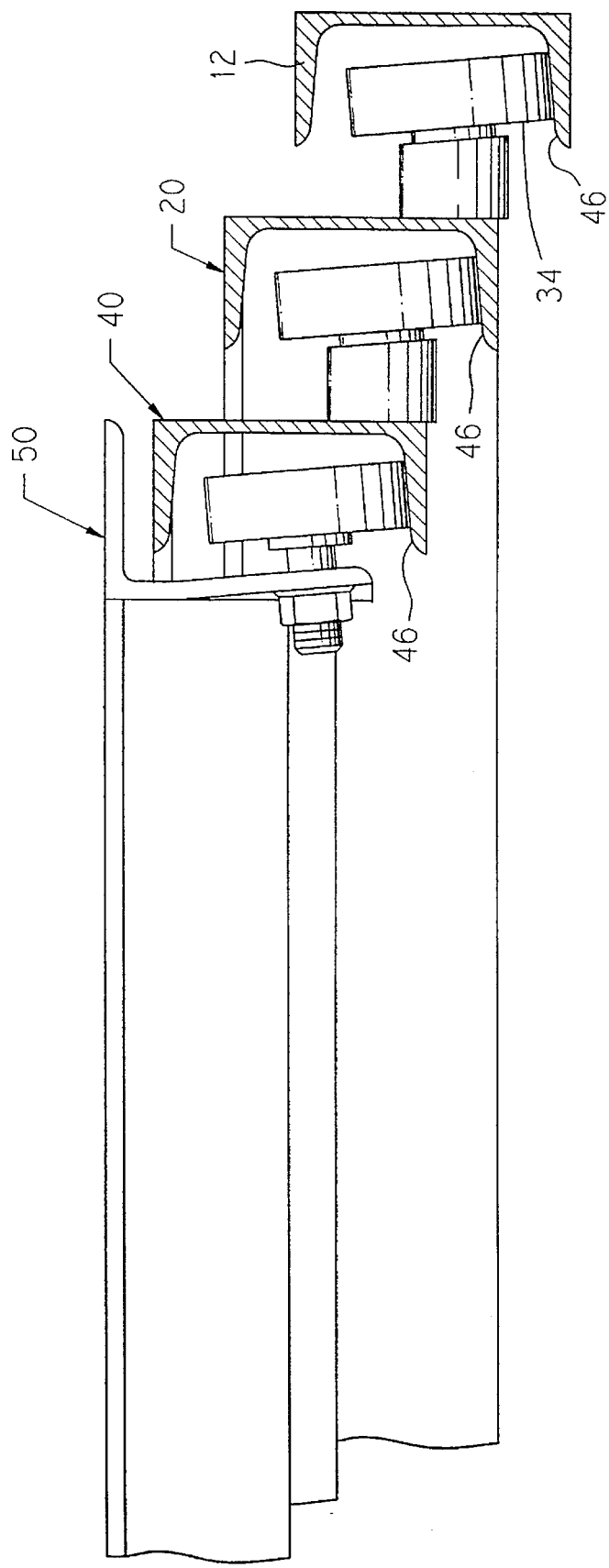
FIG. 4 is a section view fragment taken along line 4—4 FIG. 3.

As shown in FIG. 4, the wheels 34 of the outer cart 20 and middle cart 40 preferably are attached at a slight angle, so that the wheels role perpendicularly on their supporting surfaces.

Using the outer cart 20 and middle cart 40, as described above, a three-deep push-back cart storage system is provided, as a first pallet may be supported on the middle cart 40, a second pallet supported on the outer cart 20, and a third pallet supported directly on top of the support rails 12, with the middle and outer carts pushed back.

In a four-deep push-back cart storage system an inner cart 50 as shown in FIGS. 1–3 and 11–13, includes a rectangular frame 22b having front cross member 24b, side member 26b and rear cross member 28b, dimensioned to allow the inner cart to fit within the middle cart. Similar to the middle cart 40, the inner cart 50 preferably includes angle plates 32 at its front corners, and angle ends or plates on the rear cross member 28b. The rear wheels of the inner cart 50 are positioned slightly below the forward wheels. As shown in FIGS. 1–4, the front wheels on the inner cart 50 roll on the side members 26a of the middle cart 40, while the rear wheels of the inner cart 50 roll on the support rails 12. The middle cart 40 also includes slots 30 so that the inner cart 50 may be installed into the middle cart 40.

As shown in

FIG. 4, the outer, middle and inner carts are all of equal height. The small amount of vertical clearance between the carts allows flat pallets to be supported only on the top surface of a single cart. Referring to FIGS. 1 and 4, the carts roll into each other, in a somewhat telescoping arrangement, rather than rolling over or under each other. In addition, the front wheels of the middle cart 40 and inner cart 50 roll on the middle cart and outer cart 20, respectively rather than on the support rails 12.

Of course, in addition to the three-deep and four-deep embodiments described above, a five (or more) -deep embodiment may also be used, by providing one or more additional carts, as will be understood by those skilled in the art. In addition, the carts need not be rectangular, and other arrangements of the cart wheels and support flanges or rails may be used.

With the present push back system, typically a first pallet is placed on a first cart by a forklift. Then a second pallet is moved into the pallet bay for placement onto a second cart, and it pushes the first pallet back. Ideally, this should cause the first cart to move back and thereby fully expose the second cart, for reception of the second pallet. However, because the first cart rolls inside of the second cart, a frictional force is created by the wheels of the first cart which tends to move the second cart backwards with the first cart. Heavy pallet loads, imperfect bearings and fast pallet movements may increase the extent of unwanted cart movement. As a result of the premature movement, the second cart is not properly positioned to receive the second pallet, i.e., the second cart tends to be shifted rearwardly from the front of the storage rack. In cart systems having more than two carts, the same disadvantageous premature rolling movement can arise due to friction between, e.g., the third cart and the wheels of the second cart, etc.

To overcome this disadvantage, the invention provides an embodiment having a latching mechanism 60, as shown in FIGS. 14–18, where an outer side member 62 has an upper flange 64, a lower flange 66 and a web 68, with a notch 70 in the upper flange 64. The outer side member 62 may be of various designs, e.g., I-beam, C-beam, etc.

A cart frame section 72 has an intermediate side member 74, a cross member 76, a wheel assembly 78 and a spring assembly 80. The intermediate side member 74 includes an upper flange 74a, a lower flange 76a, a web 78a and a notch 70a. A wheel stop 82 is attached at the rear end of the intermediate side member 74. The wheel assembly 78 is located at the outer end of the cross member 76, which is attached to the intermediate side member 74. The wheel assembly includes an angle plate 84, a wheel 86, a wheel stud 88 and a nut (not shown). The wheel 86 is affixed to the angle plate 84 via the nut, which clamps the wheel stud 88 to the angle plate 88. The wheel 86 rolls along the lower flange 66 of the outer side member 62. Similarly, a wheel 86a clamped to an angle plate (not shown) which is affixed to an inner side member 90 rolls along the lower flange 76a of the intermediate side member 74. The spring assembly 80 includes a spring brace 92, a spring 94 and nuts 96 and bolts 98. The spring 94 is bolted to the outer end of the brace 92.

The outer side member 62 serves as a support rail for the wheel 86 of a second cart, while the intermediate side member 74 serves a dual function as both a support rail for the wheel 86a of a first cart and as a side member of the second cart. With both carts unloaded, the forwardly inclination of the side members 62 and 74 causes the wheels 86 and 86a to roll under the influence of gravity along the side members 62 and 74 to the front end of a pallet bay, resulting in a nested cart arrangement.

In a two cart arrangement, with the empty carts nested, a first load-bearing pallet is placed upon the inner side member 90 by a forklift. Then, a second load-bearing pallet is lifted by the forklift to above the level of the intermediate side member 74, such that, as the second pallet is moved into the pallet bay, it pushes against the first pallet previously loaded onto the inner side member 90. The engagement of the first pallet by the second pallet causes the wheel 86a, which is connected to the inner side member 90, to roll rearwardly. During the time that wheel 86a is traversing the lower flange 66a of the intermediate side member 74 in the rearward direction, the engaged spring 94 prevents friction between the wheel 86a and the intermediate side member 74 from causing the second cart to move rearwardly. Thus, when the wheel 86a of the intermediate side member 74 arrives at the wheel stop 82, the intermediate side member 74 has yet to appreciably move, and thereby is properly positioned to receive the second pallet.

At that point, the force of the forklift, which in inserting the second pallet into the bay for placement onto the intermediate side member 24, continues to push the first pallet rearwardly even after the wheel 36a hits the wheel stop 32. This causes the spring 44 to disengage from the notch 20 on the outer side member 12. The force of the forklift pushing the second cart against the rear of the first cart is sufficient to release the spring. The disengagement of the spring 44 frees the intermediate side member 24 and it begins in rolling rearwardly when the second pallet is placed onto the intermediate side member 24.

Figure 17:
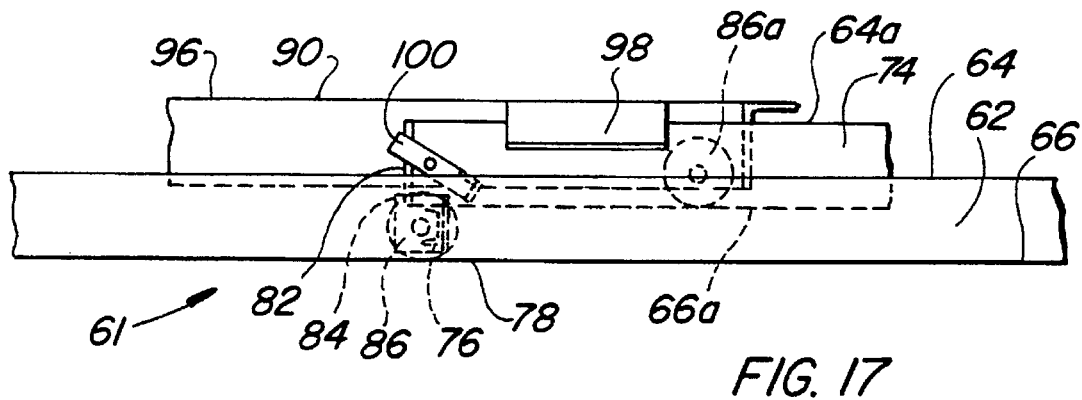
FIG. 17 is a side elevation view of a switch latch in the engaged position.
Figure 18:
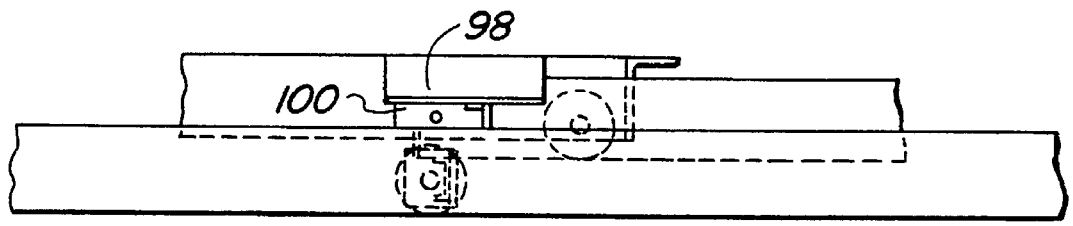
FIG. 18 is a side elevation view thereof, with the switch latch in the disengaged position.

As shown in FIGS. 17 and 18, another preferred embodiment 61 of the present latching mechanism includes a trigger plate 98 attached to an inner side member 90 of a second cart frame section 96. A switch 100 is rotatably mounted on the intermediate side member 74.

Referring to FIGS. 17 and 18, when the wheel 86a is traversing the lower flange 66a of the intermediate side member 74 rearwardly, the engaged switch 100 prevents friction between the wheel 86a and the intermediate side member 74 from causing the second cart to roll rearwardly. Thus, as the wheel 86a of the intermediate side member 74 approaches the wheel stop 82, the intermediate side member 74 has yet to appreciably move, and thereby is properly positioned to receive the second pallet. The trigger plate 98 is disposed so that as the wheel 86a approaches the wheel stop 82, the trigger plate 98 engages the switch 100, causing it to rotate and disengage from the notch 70. At that point, the intermediate side member 74 is advantageously positioned to receive the second pallet. The disengagement of the switch 100 allows the intermediate side member 74 to begin rolling rearwardly upon the depositing of the second pallet onto the intermediate side member 74.

In addition to the foregoing spring and switch embodiments, there are various other mechanical equivalents which could readily be used within the scope of the invention. Such equivalents need to hold the second cart from rolling back due to wheel friction yet release when the larger force of forklift loading is exerted. Equivalents which could be used include notches in the flanges; detent mechanisms; bump ramps; magnetic holding elements and of course many others as would be apparent to those skilled in the art.

Although the embodiments described above relate to a two cart system, a plurality of the above-described latching mechanisms can be employed to prevent premature rolling in push-back cart storage systems having three or more carts.

Thus, although several preferred embodiment has been shown and described, it would be apparent to those skilled in the art that many changes and modifications may be made thereunto without the departing from the spirit and scope of the invention.

We claim:

1. A latching mechanism comprising:
    an outer side member having a notch;
    a cart frame section having a wheel assembly supported on a lower flange of said outer side member; and
    a spring assembly engageable with said notch.

2. The latching mechanism according to claim 1 in which said notch is on an upper flange of said outer side member.

3. The latching mechanism according to claim 1 in which said spring assembly comprises a spring and a spring brace.

4. A latching mechanism comprising:
    an outer side member having a notch;
    a second cart frame section having a wheel assembly supported on said outer side member;
    a switch engageable with said notch; and
    a first cart frame section having a trigger plate engageable with said switch.

5. The latching mechanism according to claim 4 wherein said notch is on an upper flange of said outer side member.

6. The latching mechanism according to claim 4 in which said wheel assembly is supported on a lower flange of said outer side member.

7. The latching mechanism according to claim 4 in which said switch is rotatably mounted to said second cart frame section.

8. A push-back cart storage system comprising:
    a pair of spaced apart support rails;
    a first car having wheels supported on the support rails, and having opposing side members;
    a second cart having front wheels supported on the side members of the first cart, and having rear wheels supported on the support rails; and
    means for preventing the first cart from moving on the support rails due to rolling friction between the second cart and the first cart.

9. The storage system of claim 8 wherein the means for preventing comprises a spring for holding the first cart in a fixed position on the rails, until a sufficient force is applied to the first cart to cause the spring to release.

10. The storage system of claim 8 wherein the means for preventing comprises a trigger activated latch which holds the first cart in position on the rails until the second cart is pushed back into a rear most position.

11. A push-back cart storage system comprising:
    a pair of spaced apart support rails having lower flanges;
    a first cart having front and rear wheels supported on the lower flanges of the support rails, and having opposing side members; and
    a second cart having front wheels supported on the side members of the first cart, and having rear wheels supported on the lower flanges of the support rails.

12. The push-back cart storage system of claim 11 further comprising a third cart having front wheels supported on side members of the second cart, and having rear wheels supported on the lower flanges of the support rails.

13. The push-back cart storage system of claim 11 wherein each support rail comprises a structural shape having an upper flange, a lower flange symmetrical to the upper flange, and a web connecting the upper flange and lower flange, with all of the wheels of the first cart and the rear wheels of the second cart supported on the lower flange.

14. The push-back cart storage system of claim 11 wherein the rear wheels of the second cart are positioned below the front wheels of the second cart.

15. The push-back cart storage system of claim 11 wherein the side members of the first cart each comprise a structural shape having an upper flange connected to a lower flange by a web.

16. The push-back cart storage system of claim 11 wherein the first and second cart are of approximately equal height.

17. The push-back cart storage system of claim 11 wherein the front wheels of the third cart are above the front wheels of the second cart, and the front wheels of the second cart are above the front wheels of the first cart.

18. The push-back cart storage system of claim 11 wherein the rear wheels of the second cart are spaced apart farther than the front wheels of the second cart.

19. The push-back cart storage system of claim 11 further comprising means for preventing the first cart from moving on the support rails due to rolling friction between the second cart and the first cart.

* * * * *